May 12, 1942.  E. H. PIRON  2,282,823
BODY CONSTRUCTION
Filed March 15, 1939
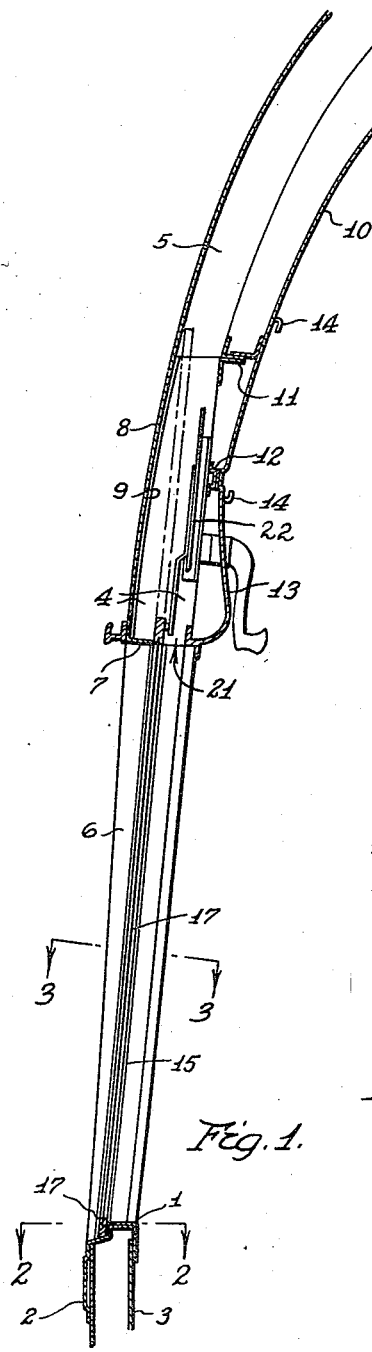
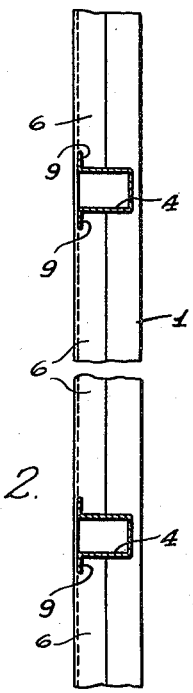
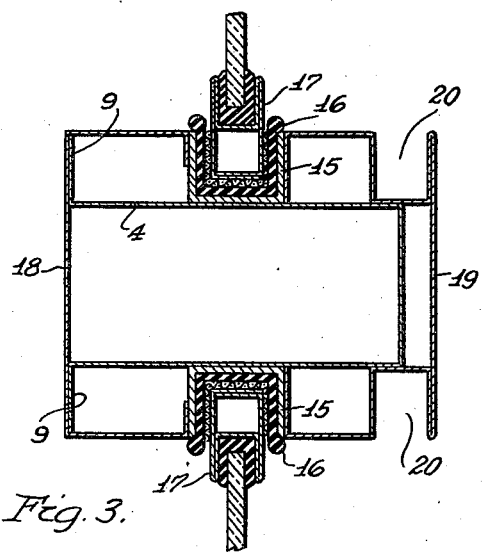
INVENTOR
Emil H. Piron
BY
ATTORNEY Patented May 12, 1942

2,282,823

UNITED STATES PATENT OFFICE 2,282,823

BODY CONSTRUCTION

Emil H. Piron, New York, N. Y., assignor to Transit Research Corporation, a corporation of New York Application March 15, 1939, Serial No. 262,033

2 Claims. (Cl. 105—397)

This invention relates to car body construction, particularly the side walls thereof, and has for its primary object to provide a body wall embodying openings for the reception of windows and means for utilizing the wall portions between the window openings as an air duct for car ventilation.

Another object is to provide an improved exterior and interior appearance by correlating the shape and construction of the wall with window openings and sash guides so that the sash may be moved upwardly into a curved portion uniting the side wall with the roof portion. With definite width and height limitations existing, as well as definite requirements as to height and size of window openings, it is found necessary in conventional construction to provide a side wall continuation above the window openings, in substantially the same plane as the portion having the openings, to accommodate the sash when raised. To conform with height limitations the continuations must necessarily extend into close proximity with the roof and the curved portions which unite said continuations with the roof must be of comparatively short radii. In the instant case, the sash guides are so arranged and the side wall and curved portion so constructed and arranged that the sash may be moved upwardly into the curved portion, thus permitting the use of a curved portion having comparatively long radii of curvature and which unites with the wall substantially at the plane of the upper edges of the window openings.

In car bodies of the type here concerned the roof is of hollow form and constitutes a part of the car ventilating system, being connected to a part of the ventilating system below the window openings, or adjacent the floor of the car, by vertical air ducts. It is a further object of this invention to provide wall portions between the window openings some or all of which may be utilized to provide communication between the interior of the roof and ventilating ducts located beneath the window openings.

Other objects and advantages will become more fully apparent, as reference is made to the accompanying drawing, wherein my invention is illustrated, and in which:

Fig. 1 is a vertical section of the body side wall, and

Figs. 2 and 3 are sections taken respectively on the lines 2—2 and 3—3 of Fig. 1.

More particularly, 1 designates a longitudinally extending belt rail having the outer wall sheeting 2 depending from the outer edge thereof and an inner liner 3 depending from the inner edge thereof. Extending upwardly through the belt rail, at longitudinally spaced intervals, are posts 4 of channel section, upon the upper ends of which the roof bows 5 rest, one of said bows being shown in the drawing.

Window openings 6 are defined at their lower edges by the belt rail 1 and at their upper edges by inturned portions 7 of sheeting material 8 which is secured to the lateral flanges 9 of the channel shaped posts 4 and to the exterior of the roof bow 6. The posts 4 have their upper ends curved inwardly of the body from the plane of the upper edges 7 of the window openings and the curved portion thereof merges with the curvature of the roof bow. The external sheeting 8 is, therefore, curved to blend with the roof curvature with its curvature commencing at substantially the plane in which the upper edges of the windows reside.

The inner liner 10 of the roof is supported by brackets or flanges 11 on the posts 4 and roof bows 5. The liner terminates at longitudinally extending supports 12, and a longitudinal trim member 13 extends between the lower edge of the lines 10 to the plane of the upper edges of the window openings 6. Immediately above the trim member 13 are provided the usual channel retainers 14 for receiving advertising cards.

Secured to opposite sides of the posts 4 are guide channels 15 having weather sealing means 16 slidably receiving the sash 17. A window-lift mechanism 22 is mounted on the support 12 and is connected to the upper end of the sash 17. The guide channels 15 are disposed in a plane substantially bisecting the angle formed by the diverging inner and outer walls of the posts 4. In other words, the window sash is normally supported in a plane which diverges upwardly from the plane of the outer surface of the wall in order that it may be moved a substantial distance upwardly without contacting the curved wall 8.

Between the belt rail 1 and the upper edge portion 7, a covering 18 of sheet metal is secured to each pair of flanges 9 and is bent inwardly over the edges of the flanges and secured to the adjacent sides of the channels 15. The inner edges of the posts 4 are similarly concealed by sheet metal 19, secured to the inner edges of the guide channels 15, and bent adjacent its inner edges to provide channel guides 20 for the reception of curtains.

The hollow roof above described ordinarily will constitute a part of a car ventilating system, in which case the hollow posts 4 may serve as ducts for providing communication between the hollow roof and another part of the system located beneath the belt rail 1. The inturned portion 7 of the outer covering 8 prevents the flow of air into or out of the roof externally of the sash. The lower edge of the trim member 13 is spaced from the sash, thus providing a space 21 through which air may flow into or out of the hollow roof.

What is claimed is:

1. In a car body, a longitudinal belt rail, posts arising from said belt rail, roof and ceiling members formed of sheeting secured to inner and outer edges of the upper portions of said posts with the roof member curving tangentially from the outer surfaces of the posts over and above the posts, said roof and ceiling sheeting together forming an air duct, said posts being hollow and constituting air ducts for circulating air through the belt rail and first named duct, and sash guides on said posts with their upper ends spaced from the roof and ceiling members and inclined with respect to said outer surfaces of said posts and in the direction of curvature of said roof member, said sash guides being so inclined as to guide a sash into the space between the roof and ceiling sheeting for a distance at least equal to the expected opening movement of the sash.

2. In a car body, a longitudinal belt rail comprising the top of a hollow wall, posts upwardly divergent as viewed in a transverse vertical plane and arising from said rail, roof and ceiling members formed of gradually curved sheeting curved divergingly and tangentially from outer and inner edges of the upper portions of said posts, said roof and ceiling members forming an upper hollow wall, said posts being hollow and constituting air ducts for circulating air between the lower and upper hollow walls, sash guides on said posts inclined with respect to the outer surfaces of said posts and in the direction of curvature of said members and with their upper ends directed between said members, a sash in said guides with its lower edge normally resting on said belt rail and its upper edge projecting slightly into said upper hollow wall, the inclination of said guides being such that the upper edge of said sash may move into the upper hollow wall and into overlapping relation with the roof sheeting a distance at least equal to the expected opening movement of the sash.

EMIL H. PIRON.